United States Patent
Zhang et al.

(10) Patent No.: US 10,505,603 B2
(45) Date of Patent: Dec. 10, 2019

(54) PRECODING MATRIX DETERMINING METHOD AND APPARATUS

(71) Applicant: Huawei Technologies Co., Ltd., Shenzhen (CN)

(72) Inventors: Ruiqi Zhang, Beijing (CN); Qiang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/021,786

(22) Filed: Jun. 28, 2018

(65) Prior Publication Data

US 2018/0309486 A1   Oct. 25, 2018

Related U.S. Application Data

(63) Continuation of application No. PCT/CN2015/099528, filed on Dec. 29, 2015.

(51) Int. Cl.
*H04B 7/06* (2006.01)
*H04B 7/0456* (2017.01)

(52) U.S. Cl.
CPC ......... *H04B 7/0478* (2013.01); *H04B 7/0486* (2013.01); *H04B 7/06* (2013.01); *H04B 7/0639* (2013.01)

(58) Field of Classification Search
CPC ...... H04B 7/06; H04B 7/0639; H04B 7/0486; H04B 7/0478
See application file for complete search history.

(56) References Cited

U.S. PATENT DOCUMENTS

| | | | |
|---|---|---|---|
| 2008/0186212 A1* | 8/2008 | Clerckx | H04B 7/0456 341/55 |
| 2011/0216846 A1* | 9/2011 | Lee, II | H04B 7/0473 375/295 |
| 2012/0307935 A1 | 12/2012 | Zhang et al. | |

(Continued)

FOREIGN PATENT DOCUMENTS

| | | |
|---|---|---|
| CN | 102088302 A | 6/2011 |
| CN | 102195755 A | 9/2011 |

(Continued)

OTHER PUBLICATIONS

"Codebook enhancements for EBF/FD-MIMO," 3GPP TSG RAN WG1 Meeting #81, Fukuoka, Japan, R1-152484 (May 25-29, 2015).

*Primary Examiner* — Syed Haider
(74) *Attorney, Agent, or Firm* — Leydig, Voit & Mayer, Ltd.

(57) ABSTRACT

A precoding matrix determining method and apparatus are provided. A terminal determines a precoding matrix, where the precoding matrix includes at least two column vector sets, a column vector associated with any column vector set of the at least two column vector sets exists in the at least two column vector sets, and both the any column vector set and the associated column vector are applied on different polarization antennas; the terminal determines a first precoding matrix indicator (PMI) and a second PMI based on the precoding matrix; and the terminal sends the first PMI and the second PMI to a base station. In this solution, different column vectors are applied to different polarization antennas. Therefore, a prior-art defect of unbalanced beam coverage performance is overcome.

18 Claims, 3 Drawing Sheets

(56) References Cited

U.S. PATENT DOCUMENTS

2013/0064317 A1    3/2013  Tong et al.
2016/0036507 A1*   2/2016  Wang ................... H04B 7/0456
                                                  375/267
2016/0087701 A1*   3/2016  Wu ....................... H04B 7/0417
                                                  375/267

FOREIGN PATENT DOCUMENTS

CN        103227672 A      7/2013
CN        104009785 A      8/2014
CN        104321983 A      1/2015
WO     WO-2014194479 A1 *  12/2014    ........... H04B 7/0417

* cited by examiner

PRECODING MATRIX DETERMINING METHOD AND APPARATUS

CROSS-REFERENCE TO RELATED APPLICATIONS

This application is a continuation of International Application No. PCT/CN2015/099528, filed on Dec. 29, 2015, the disclosure of which is hereby incorporated by reference in its entirety.

TECHNICAL FIELD

Embodiments of the present disclosure relate to the field of communications technologies, and in particular, to a precoding matrix determining method and apparatus.

BACKGROUND

In an LTE (Long Term Evolution) system, for a cell edge user, an SFBC (space frequency block coding) transmission mode is used to improve a cell edge signal-to-noise ratio. For a cell center user, a transmission mode of multi-layer parallel transmission is used to provide a relatively high data transmission rate. If a base station may obtain all or a part of downlink channel information, the base station may use a precoding technology to improve signal transmission quality or a signal transmission rate. For a TDD (time division duplex) system, a radio channel has uplink and downlink reciprocity, and a precoding weight vector of a downlink channel may be estimated based on an uplink channel. However, for an FDD (frequency division duplex) system, because an uplink carrier frequency and a downlink carrier frequency are different, a precoding weight vector of a downlink channel cannot be obtained by using an uplink channel.

In the LTE system, for the FDD system, the base station obtains a precoding matrix in a manner in which a terminal device feeds back the precoding matrix. Currently, feedback load is reduced by using a two-level codebook feedback mechanism, that is, the precoding matrix W is constituted by a product of a first-level feedback matrix $W_1$ and a second-level feedback matrix $W_2$:

$$W = W_1 \times W_2 \quad \text{(Formula 1)}$$

The first-level feedback matrix $W_1$ is applicable to entire system bandwidth, and has a long period characteristic. A function of the second-level feedback matrix $W_2$ is that each sub-band selects a precoding weight vector and selects a phase (co-phase) difference between two polarization directions based on the second-level feedback matrix. Because $W_2$ is fed back on the basis of each sub-band and has a short period characteristic, a quantity of bits required for feeding back $W_2$ largely affects feedback overhead.

With application of a two-dimensional (2D) antenna technology, a data throughput rate and edge coverage in both a horizontal direction and a vertical direction need to be obtained in a precoding manner. Currently, $W_1$ is constructed in a commonly used manner of a Kronecker product of a beam vector in a vertical direction and a beam vector in a horizontal direction:

$$W_1 = \begin{bmatrix} X_H^k \otimes X_V^l & \\ & X_H^k \otimes X_V^l \end{bmatrix} \quad \text{(Formula 2)}$$

$X_H^k$ is a beam vector cluster selected from the horizontal direction, and includes $M_H$ column vectors; $X_V^l$ is a beam vector cluster selected from the vertical direction, and includes $M_V$ column vectors.

Because an increase in codebooks (codebook) results in an increase in overhead required for feeding back the codebooks, how to reduce the overhead for feeding back the codebooks is a problem that needs to be resolved. In the LTE Rel. 10 protocol, when a rank is 1 to 4, four bits are required to feed back $W_2$. A degree of freedom in a vertical dimension is used in the 2D antenna technology. Therefore, there are more than four to-be-selected beam vectors in $W_2$, and therefore not only complexity of selecting a beam vector by a receive end is increased, but also complexity of feeding back a selected codebook is increased.

To overcome the increase in feedback overheads caused by the use of the 2D antenna technology, an existing technical solution uses a downsampling (subsampling) method. Although the downsampling method can reduce the feedback overhead, a spatial resolution of the beam vector is reduced to some extent. However, in the solution, a same column vector is applied on different polarization antennas, and therefore beam coverage has different performance in different angles, thereby causing a coverage hole.

In conclusion, although the foregoing method can reduce feedback overhead, there is a defect of unbalanced beam coverage performance.

SUMMARY

Embodiments of the present disclosure provide a precoding matrix determining method, so as to overcome a prior-art defect of unbalanced beam coverage performance.

According to a first aspect, a precoding matrix determining method is provided, including:

determining, by a terminal, a precoding matrix, where the precoding matrix includes at least two column vector sets, a column vector associated with any column vector set of the at least two column vector sets exists in the at least two column vector sets, and both the any column vector set and the associated column vector are applied on different polarization antennas;

determining, by the terminal, a first precoding matrix indicator (PMI) and a second PMI based on the precoding matrix; and sending, by the terminal, the first PMI and the second PMI to a base station.

With reference to the first aspect, in a first possible implementation, the determining, by a terminal, a precoding matrix includes:

determining, by the terminal, a rank used to indicate a quantity of transmission layers and a codebook set corresponding to the rank; and selecting, by the terminal, the precoding matrix from the codebook set.

With reference to the first aspect or the first possible implementation of the first aspect, in a second possible implementation, the precoding matrix satisfies the following rule:

$$W = \begin{bmatrix} v_{n_1} & v_{n_2} & \cdots & v_{n_k} \\ \varphi_1 v_{m_1} & \varphi_2 v_{m_2} & \cdots & \varphi_K v_{m_k} \end{bmatrix},$$

where $v_{n_k}$ and $v_{m_k}$ indicate an $n_k^{th}$ column vector and an $m_k^{th}$ column vector that are in a vector group set, $v_{n_k}$ is associated with $v_{m_k}$, $n_k \neq m_k$ is satisfied, k=1, 2, ..., K, and $\phi_i$ is a phase compensation factor.

With reference to the first aspect or the first to the second possible implementations of the first aspect, in a third possible implementation, the first PMI is corresponding to a first-level feedback matrix, and the first-level feedback matrix is a diagonal matrix.

With reference to the third possible implementation of the first aspect, in a fourth possible implementation, the first-level feedback matrix satisfies the following rule:

$$W_1 = \begin{bmatrix} X_0 & 0 \\ 0 & X_m \end{bmatrix},$$

where $W_1$ is the first-level feedback matrix.

With reference to the fourth possible implementation of the first aspect, in a fifth possible implementation, the second PMI is corresponding to a second-level feedback matrix, and the second-level feedback matrix includes at least one first column vector in $X_n$ and at least one second column vector in $X_m$.

With reference to the fifth possible implementation of the first aspect, in a sixth possible implementation, if $X_n$ is the same as $X_m$, a first column vector different from the at least one second column vector exists in the at least one first column vector; or if $X_n$ is different from $X_m$, a column number of a column vector selected by $W_2$ from a diagonal matrix $X_n$ of $W_1$ is the same as a column vector number of a column vector selected from $X_m$.

According to a second aspect, a precoding matrix determining method is provided, including:

receiving, by a base station, a first precoding matrix indicator (PMI) and a second PMI that are sent by a terminal; and determining, by the base station, a precoding matrix based on the first PMI and the second PMI, where the precoding matrix includes at least two column vector sets, a column vector associated with any column vector set of the at least two column vector sets exists in the at least two column vector sets, and both the any column vector set and the associated column vector are applied on different polarization antennas.

With reference to the second aspect, in a first possible implementation, the determining, by the base station, a precoding matrix based on the first PMI and the second PMI includes:

determining, by the base station, a rank used to indicate a quantity of transmission layers and a codebook set corresponding to the rank; and selecting, by the base station, the precoding matrix from the codebook set based on the first PMI and the second PMI.

With reference to the second aspect or the first possible implementation of the second aspect, in a second possible implementation, the precoding matrix satisfies the following rule:

$$W = \begin{bmatrix} v_{n_1} & v_{n_2} & \cdots & v_{n_k} \\ \varphi_1 v_{m_1} & \varphi_2 v_{m_2} & \cdots & \varphi_K v_{m_k} \end{bmatrix},$$

where $v_{n_k}$ and $v_{m_k}$ indicate an $n_k^{th}$ column vector and an $m_k^{th}$ column vector that are in a vector group set, $v_{n_k}$ is associated with $v_{m_k}$, $n_k \neq m_k$ is satisfied, k=1, 2, ..., K, and $\phi_i$ is a phase compensation factor.

With reference to the second aspect or the first to the second possible implementations of the second aspect, in a third possible implementation, the first PMI is corresponding to a first-level feedback matrix, and the first-level feedback matrix is a diagonal matrix.

With reference to the third possible implementation of the second aspect, in a fourth possible implementation, the first-level feedback matrix satisfies the following rule:

$$W_1 = \begin{bmatrix} X_0 & 0 \\ 0 & X_m \end{bmatrix},$$

where $W_1$ is the first-level feedback matrix.

With reference to the fourth possible implementation of the second aspect, in a fifth possible implementation, the second PMI is corresponding to a second-level feedback matrix, and the second-level feedback matrix includes at least one first column vector in $X_n$ and at least one second column vector in $X_m$.

With reference to the fifth possible implementation of the second aspect, in a sixth possible implementation, if $X_n$ is the same as $X_m$, a first column vector different from the at least one second column vector exists in the at least one first column vector; or if $X_n$ is different from $X_m$, a column number of a column vector selected by $W_2$ from a diagonal matrix $X_n$ of $W_1$ is the same as a column vector number of a column vector selected from $X_m$.

According to a third aspect, a precoding matrix determining apparatus is provided, including:

a processing unit, configured to determine a precoding matrix, where the precoding matrix includes at least two column vector sets, a column vector associated with any column vector set of the at least two column vector sets exists in the at least two column vector sets, and both the any column vector set and the associated column vector are applied on different polarization antennas, where the processing unit is further configured to determine a first precoding matrix indicator (PMI) and a second PMI based on the precoding matrix; and a sending unit, configured to send the first PMI and the second PMI to a base station.

With reference to the third aspect, in a first possible implementation, when determining the precoding matrix, the processing unit is specifically configured to:

determine a rank used to indicate a quantity of transmission layers and a codebook set corresponding to the rank; and select the precoding matrix from the codebook set.

With reference to the third aspect or the first possible implementation of the third aspect, in a second possible implementation, the precoding matrix satisfies the following rule:

$$W = \begin{bmatrix} v_{n_1} & v_{n_2} & \cdots & v_{n_k} \\ \varphi_1 v_{m_1} & \varphi_2 v_{m_2} & \cdots & \varphi_K v_{m_k} \end{bmatrix},$$

where $v_{n_k}$ and $v_{m_k}$ indicate an $n_k^{th}$ column vector and an $m_k^{th}$ column vector that are in a vector group set, $n_{n_k}$ is associated with $v_{m_k}$, $n_k \neq m_k$ is satisfied, k=1, 2, ..., K, and $\phi_i$ is a phase compensation factor.

With reference to the third aspect or the first to the second possible implementations of the third aspect, in a third possible implementation, the first PMI is corresponding to a first-level feedback matrix, and the first-level feedback matrix is a diagonal matrix.

With reference to the third possible implementation of the third aspect, in a fourth possible implementation, the first-level feedback matrix satisfies the following rule:

$$W_1 = \begin{bmatrix} X_n & 0 \\ 0 & X_m \end{bmatrix},$$

where $W_1$ is the first-level feedback matrix.

With reference to the fourth possible implementation of the third aspect, in a fifth possible implementation, the second PMI is corresponding to a second-level feedback matrix, and the second-level feedback matrix includes at least one first column vector in $X_n$ and at least one second column vector in $X_m$.

With reference to the fifth possible implementation of the third aspect, in a sixth possible implementation, if $X_n$ is the same as $X_m$, a first column vector different from the at least one second column vector exists in the at least one first column vector; or if $X_n$ is different from $X_m$, a column number of a column vector selected by $W_2$ from a diagonal matrix $X_n$ of $W_1$ is the same as a column vector number of a column vector selected from $X_m$.

According to a fourth aspect, a precoding matrix determining apparatus is provided, including:

a receiving unit, configured to receive a first precoding matrix indicator (PMI) and a second PMI that are sent by a terminal; and a processing unit, configured to determine a precoding matrix based on the first PMI and the second PMI, where the precoding matrix includes at least two column vector sets, a column vector associated with any column vector set of the at least two column vector sets exists in the at least two column vector sets, and both the any column vector set and the associated column vector are applied on different polarization antennas.

With reference to the fourth aspect, in a first possible implementation, when determining the precoding matrix based on the first PMI and the second PMI, the processing unit is specifically configured to:

determine a rank used to indicate a quantity of transmission layers and a codebook set corresponding to the rank; and select the precoding matrix from the codebook set based on the first PMI and the second PMI.

With reference to the fourth aspect or the first possible implementation of the fourth aspect, in a second possible implementation, the precoding matrix satisfies the following rule:

$$W = \begin{bmatrix} v_{n_1} & v_{n_2} & \cdots & v_{n_k} \\ \varphi_1 v_{m_1} & \varphi_2 v_{m_2} & \cdots & \varphi_K v_{m_k} \end{bmatrix},$$

where $v_{n_k}$ and $v_{m_k}$ indicate an $n_k^{th}$ column vector and an $m_k^{th}$ column vector that are in a vector group set, $v_{n_k}$ is associated with $v_{m_k}$, $n_k \neq m_k$ is satisfied, k=1, 2, ..., K, and $\phi_i$ is a phase compensation factor.

With reference to the fourth aspect or the first to the second possible implementations of the fourth aspect, in a third possible implementation, the first PMI is corresponding to a first-level feedback matrix, and the first-level feedback matrix is a diagonal matrix.

With reference to the third possible implementation of the fourth aspect, in a fourth possible implementation, the first-level feedback matrix satisfies the following rule:

$$W_1 = \begin{bmatrix} X_n & 0 \\ 0 & X_m \end{bmatrix},$$

where $W_1$ is the first-level feedback matrix.

With reference to the fourth possible implementation of the fourth aspect, in a fifth possible implementation, the second PMI is corresponding to a second-level feedback matrix, and the second-level feedback matrix includes at least one first column vector in $X_n$ and at least one second column vector in $X_m$.

With reference to the fifth possible implementation of the fourth aspect, in a sixth possible implementation, if $X_n$ is the same as $X_m$, a first column vector different from the at least one second column vector exists in the at least one first column vector; or if $X_n$ is different from $X_m$, a column number of a column vector selected by $W_2$ from a diagonal matrix $X_n$ of $W_1$ is the same as a column vector number of a column vector selected from $X_m$.

According to a fifth aspect, a precoding matrix determining apparatus is provided, including:

a processor, configured to determine a precoding matrix, where the precoding matrix includes at least two column vector sets, a column vector associated with any column vector set of the at least two column vector sets exists in the at least two column vector sets, and both the any column vector set and the associated column vector are applied on different polarization antennas, where the processor is further configured to determine a first precoding matrix indicator (PMI) and a second PMI based on the precoding matrix; and a transmitter, configured to send the first PMI and the second PMI to a base station.

With reference to the fifth aspect, in a first possible implementation, when determining the precoding matrix, the processor is specifically configured to:

determine a rank used to indicate a quantity of transmission layers and a codebook set corresponding to the rank; and select the precoding matrix from the codebook set.

With reference to the fifth aspect or the first possible implementation of the fifth aspect, in a second possible implementation, the precoding matrix satisfies the following rule:

$$W = \begin{bmatrix} v_{n_1} & v_{n_2} & \cdots & v_{n_k} \\ \varphi_1 v_{m_1} & \varphi_2 v_{m_2} & \cdots & \varphi_K v_{m_k} \end{bmatrix},$$

where $v_{n_k}$ and $v_{m_k}$ indicate an $n_k^{th}$ column vector and an $m_k^{th}$ column vector that are in a vector group set, $v_{n_k}$ is associated with $v_{m_k}$, $n_k \neq m_k$ is satisfied, k=1, 2, ..., K, and $\phi_i$ is a phase compensation factor.

With reference to the fifth aspect or the first to the second possible implementations of the fifth aspect, in a third possible implementation, the first PMI is corresponding to a first-level feedback matrix, and the first-level feedback matrix is a diagonal matrix.

With reference to the third possible implementation of the fifth aspect, in a fourth possible implementation, the first-level feedback matrix satisfies the following rule:

$$W_1 = \begin{bmatrix} X_n & 0 \\ 0 & X_m \end{bmatrix},$$

where $W_1$ is the first-level feedback matrix.

With reference to the fourth possible implementation of the fifth aspect, in a fifth possible implementation, the second PMI is corresponding to a second-level feedback matrix, and the second-level feedback matrix includes at least one first column vector in $X_n$ and at least one second column vector in $X_m$.

With reference to the fifth possible implementation of the fifth aspect, in a sixth possible implementation, if $X_n$ is the same as $X_m$, a first column vector different from the at least one second column vector exists in the at least one first column vector; or if $X_n$ is different from $X_m$, a column number of a column vector selected by $W_2$ from a diagonal matrix $X_n$ of $W_1$ is the same as a column vector number of a column vector selected from $X_m$.

According to a sixth aspect, a precoding matrix determining apparatus is provided, including:

a receiver, configured to receive a first precoding matrix indicator (PMI) and a second PMI that are sent by a terminal; and a processor, configured to determine a precoding matrix based on the first PMI and the second PMI, where the precoding matrix includes at least two column vector sets, a column vector associated with any column vector set of the at least two column vector sets exists in the at least two column vector sets, and both the any column vector set and the associated column vector are applied on different polarization antennas.

With reference to the sixth aspect, in a first possible implementation, when determining the precoding matrix based on the first PMI and the second PMI, the processor is specifically configured to:

determine a rank used to indicate a quantity of transmission layers and a codebook set corresponding to the rank; and select the precoding matrix from the codebook set based on the first PMI and the second PMI.

With reference to the sixth aspect or the first possible implementation of the sixth aspect, in a second possible implementation, the precoding matrix satisfies the following rule:

$$W = \begin{bmatrix} v_{n_1} & v_{n_2} & \cdots & v_{n_k} \\ \varphi_1 v_{m_1} & \varphi_2 v_{m_2} & \cdots & \varphi_K v_{m_k} \end{bmatrix},$$

where $v_{n_k}$ and $v_{m_k}$ indicate an $n_k^{th}$ column vector and an $m_k^{th}$ column vector that are in a vector group set, $n_k$ is associated with $v_{m_k}$, $n_k \neq m_k$ is satisfied, k=1, 2, ..., K, and $\phi_i$ is a phase compensation factor.

With reference to the sixth aspect or the first to the second possible implementations of the sixth aspect, in a third possible implementation, the first PMI is corresponding to a first-level feedback matrix, and the first-level feedback matrix is a diagonal matrix.

With reference to the third possible implementation of the sixth aspect, in a fourth possible implementation, the first-level feedback matrix satisfies the following rule:

$$W_1 = \begin{bmatrix} X_n & 0 \\ 0 & X_m \end{bmatrix},$$

where $W_1$ is the first-level feedback matrix.

With reference to the fourth possible implementation of the sixth aspect, in a fifth possible implementation, the second PMI is corresponding to a second-level feedback matrix, and the second-level feedback matrix includes at least one first column vector in $X_n$ and at least one second column vector in $X_m$.

With reference to the fifth possible implementation of the sixth aspect, in a sixth possible implementation, if $X_n$ is the same as $X_m$, a first column vector different from the at least one second column vector exists in the at least one first column vector; or if $X_n$ is different from $X_m$, a column number of a column vector selected by $W_2$ from a diagonal matrix $X_n$ of $W_1$ is the same as a column vector number of a column vector selected from $X_m$.

In the embodiments of the present disclosure, the precoding matrix determining method is provided. A terminal determines a precoding matrix, where the precoding matrix includes at least two column vector sets, a column vector associated with any column vector set of the at least two column vector sets exists in the at least two column vector sets, and both the any column vector set and the associated column vector are applied on different polarization antennas; the terminal determines a first precoding matrix indicator PMI and a second PMI based on the precoding matrix; and the terminal sends the first PMI and the second PMI to a base station. In this solution, different column vectors are applied to different polarization antennas. Therefore, a prior-art defect of unbalanced beam coverage performance is overcome.

DESCRIPTION OF EMBODIMENTS

To make the objectives, technical solutions, and advantages of the present disclosure embodiments clearer, the following further describes the present disclosure embodiments in detail with reference to the accompanying drawings. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
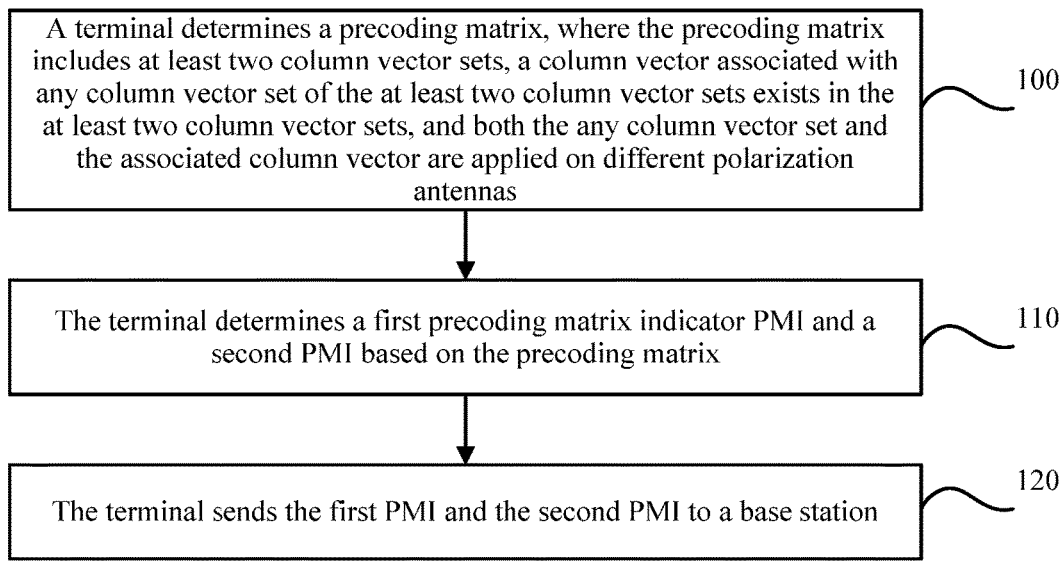
FIG. 1 is a flowchart of determining a precoding matrix according to an embodiment of the present disclosure.

Referring to FIG. 1, in an embodiment of the present disclosure, a precoding matrix determining method is provided, and a procedure is as follows:

Step 100: A terminal determines a precoding matrix, where the precoding matrix includes at least two column vector sets, a column vector associated with any column vector set of the at least two column vector sets exists in the at least two column vector sets, and both the any column vector set and the associated column vector are applied on different polarization antennas.

Step 110: The terminal determines a first precoding matrix indicator (PMI) and a second PMI based on the precoding matrix.

Step 120: The terminal sends the first PMI and the second PMI to a base station.

In this solution, different column vectors are applied on different polarization antennas. Therefore, a prior-art defect of unbalanced beam coverage performance is overcome. In this embodiment of the present disclosure, there are a plurality of manners of determining the precoding matrix by the terminal. Optionally, the following manner may be used:

The terminal determines a rank used to indicate a quantity of transmission layers and a codebook set corresponding to the rank; and the terminal selects the precoding matrix from the codebook set.

In this embodiment of the present disclosure, optionally, the precoding matrix satisfies the following rule:

$$W = \begin{bmatrix} v_{n_1} & v_{n_2} & \cdots & v_{n_k} \\ \varphi_1 v_{m_1} & \varphi_2 v_{m_2} & \cdots & \varphi_K v_{m_k} \end{bmatrix} \quad \text{(Formula 3)}$$

$v_{n_k}$ and $v_{m_k}$ indicate an $n_k^{th}$ column vector and an $m_k^{th}$ column vector that are in a vector group set, $v_{n_k}$ is associated with $v_{m_k}$, $n_k \neq m_k$ is satisfied, k=1, 2, . . . , K, and $\phi_i$ is a phase compensation factor.

In this embodiment of the present disclosure, optionally, the first PMI is corresponding to a first-level feedback matrix, and the first-level feedback matrix is a diagonal matrix.

In this embodiment of the present disclosure, optionally, the first-level feedback matrix satisfies the following rule:

$$W_1 = \begin{bmatrix} X_n & 0 \\ 0 & X_m \end{bmatrix} \quad \text{(Formula 4)}$$

$W_1$ is the first-level feedback matrix.

In a codebook design of two-dimensional antennas, it is assumed that a quantity of first-dimensional antenna ports is $N_1$, and a quantity of second-dimensional antenna ports is $N_2$. $X_n$ and $X_m$ are separately generated in a manner of a Kronecker product of a first-dimensional codebook and a second-dimensional codebook. That is, $X_n = X_1^k \otimes X_2^l$, and $X_m = X_1^{k'} \otimes X_2^{l'}$. $X_1^k$ and are DFT matrixes whose dimension is $N_1 \times K$, and $X_2^l$ and $X_2^{l'}$ are DFT matrixes whose dimension is $N_2 \times L$.

An $i^{th}$ column vector of $X_1^k$ satisfies the following rule:

$$(X_1^k)_i = \begin{bmatrix} 1 & e^{j2\pi \frac{k_i}{Q_1}} & \cdots & e^{j2\pi \frac{k_i}{Q_1}(N_1-1)} \end{bmatrix} \quad \text{(Formula 5)}$$

An $i^{th}$ column vector of $X_1^{k'}$ satisfies the following rule:

$$(X_1^{k'})_i = \begin{bmatrix} 1 & e^{j2\pi \frac{k'_i}{Q_1}} & \cdots & e^{j2\pi \frac{k'_i}{Q_1}(N_1-1)} \end{bmatrix} \quad \text{(Formula 6)}$$

An $i^{th}$ column vector of $X_2^l$ satisfies the following rule:

$$(X_2^l)_i = \begin{bmatrix} 1 & e^{j2\pi \frac{l_i}{Q_2}} & \cdots & e^{j2\pi \frac{l_i}{Q_2}(N_2-1)} \end{bmatrix} \quad \text{(Formula 7)}$$

An $i^{th}$ column vector of $X_2^{l'}$ satisfies the following rule:

$$(X_2^{l'})_i = \begin{bmatrix} 1 & e^{j2\pi \frac{l'_i}{Q_2}} & \cdots & e^{j2\pi \frac{l'_i}{Q_2}(N_2-1)} \end{bmatrix} \quad \text{(Formula 8)}$$

In this embodiment of the present disclosure, there are two relationships between $X_m$ and $X_n$.

A first relationship is $X_n = X_m$.

For example, when k=4 and l=2, $$X_n = X_1^k \otimes X_2^l = \begin{bmatrix} (X_1^k)_1 \otimes (X_2^l)_1 & (X_1^k)_2 \otimes (X_2^l)_1 & (X_1^k)_3 \otimes (X_2^l)_1 & (X_1^k)_4 \otimes (X_2^l)_1 \\ (X_1^k)_1 \otimes (X_2^l)_2 & (X_1^k)_2 \otimes (X_2^l)_2 & (X_1^k)_3 \otimes (X_2^l)_2 & (X_1^k)_4 \otimes (X_2^l)_2 \end{bmatrix} = \quad \text{(Formula 9)}$$

$$\begin{bmatrix} b_{k_1,l_1}, b_{k_2,l_1}, b_{k_3,l_1}, b_{k_4,l_1}, \\ b_{k_1,l_2}, b_{k_2,l_2}, b_{k_3,l_2}, b_{k_4,l_2}, \end{bmatrix}$$

There are two association relationships between associated vectors in $W_1$:

(1) Second dimensions are the same, and in this case, $X_n$ may be divided into four groups:
a first group is $X_n^{(1)} = \{b_{k_1,l_1}, b_{k_2,l_1}\}$;
a second group is $X_n^{(2)} = \{b_{k_3,l_1}, b_{k_4,l_1}\}$;
a third group is $X_n^{(3)} = \{b_{k_1,l_2}, b_{k_2,l_2}\}$; and
a fourth group is $X_n^{(4)} = \{b_{k_3,l_2}, b_{k_4,l_2}\}$.

That is, two vector sets in the first group are associated, two vector sets in the second group are associated, two vector sets in the third group are associated, and two vector sets in the fourth group are associated.

(2) First dimensions are the same, and in this case, $X_n$ may be divided into four groups:
a first group is $X_n^{(1)} = \{b_{k_1,l_1}, b_{k_1,l_2}\}$;
a second group is $X_n^{(2)} = \{b_{k_2,l_1}, b_{k_2,l_2}\}$;
a third group is $X_n^{(3)} = \{b_{k_3,l_1}, b_{k_3,l_2}\}$; and
a fourth group is $X_n^{(4)} = \{b_{k_4,l_1}, b_{k_4,l_2}\}$.

Likewise, two vector sets in the first group are associated, two vector sets in the second group are associated, two vector sets in the third group are associated, and two vector sets in the fourth group are associated.

When the rank indicating the quantity of transmission layers is 1, $W_2$ is used to select a group number, and select a phase difference between two vectors in a group. For example, if $W_2$ selects the second group, and the phase difference between two vectors is $\phi$, for the association relationship between the associated vectors when the second dimensions are the same, W satisfies the following rule:

$$W = W_1 W_2 = \begin{bmatrix} b_{k_3,l_1} \\ \phi b_{k_4,l_1} \end{bmatrix} \quad \text{(Formula 10)}$$

For the association relationship between the associated vectors when the first dimensions are the same, W satisfies the following rule:

$$W = W_1 W_2 = \begin{bmatrix} b_{k_2,l_1} \\ \phi b_{k_2,l_2} \end{bmatrix} \quad \text{(Formula 11)}$$

A second relationship is $X_n \neq X_m$.

In this case, $X_n$ and $X_m$ each have four column vectors.

(Formula 12)
When $k = 2$ and $l = 2$,
$X_n = [(X_1^k)_1 \otimes (X_2^l)_1 \quad (X_1^k)_3 \otimes (X_2^l)_1 \quad (X_1^k)_1 \otimes (X_2^l)_2 \quad (X_1^k)_3 \otimes (X_2^l)_2]$
$= [b_{k_1,l_1}, b_{k_3,l_1}, b_{k_1,l_2}, b_{k_3,l_2}]$ (Formula 13)
$X_m = [(X_1^k)_2 \otimes (X_2^l)_1 \quad (X_1^k)_4 \otimes (X_2^l)_1 \quad (X_1^k)_2 \otimes (X_2^l)_2 \quad (X_1^k)_4 \otimes (X_2^l)_2]$
$= [b_{k_2,l_1}, b_{k_4,l_1}, b_{k_2,l_2}, b_{k_4,l_2}]$ (Formula 14)
When $k = 4$ and $l = 1$,
$X_n = [(X_1^k)_1 \otimes (X_2^l)_1 \quad (X_1^k)_2 \otimes (X_2^l)_1 \quad (X_1^k)_3 \otimes (X_2^l)_1 \quad (X_1^k)_4 \otimes (X_2^l)_1]$
$= [b_{k_1,l_1}, b_{k_2,l_1}, b_{k_3,l_1}, b_{k_4,l_1},]$ (Formula 15)
$X_m = [(X_1^k)_1 \otimes (X_2^l)_2 \quad (X_1^k)_2 \otimes (X_2^l)_2 \quad (X_1^k)_3 \otimes (X_2^l)_2 \quad (X_1^k)_4 \otimes (X_2^l)_2]$
$= [b_{k_1,l_2}, b_{k_2,l_2}, b_{k_3,l_2}, b_{k_4,l_2},]$ When the rank indicating the quantity of transmission layers is 1, $W_2$ is used to select a group number, and select a phase difference between two vectors in a group. For example, if $W_2$ selects the second group, and the phase difference between two vectors is $\phi$, for the association relationship between the associated vectors when the second dimensions are the same, W satisfies the following rule:

$$W = W_1 W_2 = \begin{bmatrix} b_{k_3,l_1} \\ \phi b_{k_4,l_1} \end{bmatrix}.$$

For the association relationship between the associated vectors when the first dimensions are the same, W satisfies the following rule:

$$W = W_1 W_2 = \begin{bmatrix} b_{k_2,l_1} \\ \phi b_{k_2,l_2} \end{bmatrix}.$$

In this embodiment of the present disclosure, optionally, the second PMI is corresponding to a second-level feedback matrix, and the second-level feedback matrix includes at least one first column vector in $X_n$ and at least one second column vector in $X_m$.

In this embodiment of the present disclosure, optionally, if $X_n$ is the same as $X_m$, a first column vector different from the at least one second column vector exists in the at least one first column vector.

If $X_n$ is different from $X_m$, a column number of a column vector selected by $W_2$ from a diagonal matrix $X_n$ of $W_1$ is the same as a column vector number of a column vector selected from $X_m$.

Figure 2:
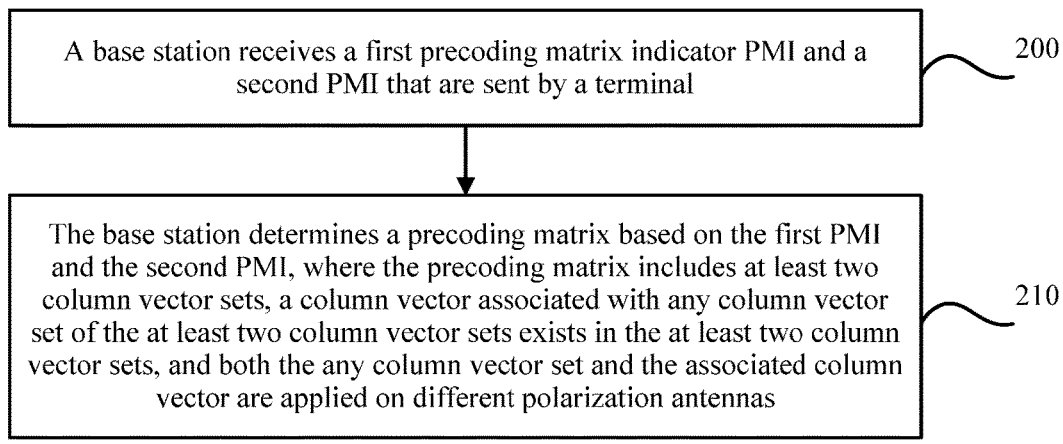
FIG. 2 is another flowchart of determining a precoding matrix according to an embodiment of the present disclosure.

Referring to FIG. 2, in an embodiment of the present disclosure, another precoding matrix determining method is provided, and a procedure is as follows:

Step 200: A base station receives a first precoding matrix indicator (PMI) and a second PMI that are sent by a terminal.

Step 210: The base station determines a precoding matrix based on the first PMI and the second PMI, where the precoding matrix includes at least two column vector sets, a column vector associated with any column vector set of the at least two column vector sets exists in the at least two column vector sets, and both the any column vector set and the associated column vector are applied on different polarization antennas.

Optionally, that the base station determines a precoding matrix based on the first PMI and the second PMI includes:
  determining, by the base station, a rank used to indicate a quantity of transmission layers and a codebook set corresponding to the rank; and
  selecting, by the base station, the precoding matrix from the codebook set based on the first PMI and the second PMI.

Optionally, the precoding matrix satisfies the following rule:

$$W = \begin{bmatrix} v_{n_1} & v_{n_2} & \cdots & v_{n_k} \\ \varphi_1 v_{m_1} & \varphi_2 v_{m_2} & \cdots & \varphi_K v_{m_k} \end{bmatrix},$$

where $v_{n_k}$ and $v_{m_k}$ indicate an $n_k^{th}$ column vector and an $m_k^{th}$ column vector that are in a vector group set, $v_{n_k}$ is associated with $v_{m_k}$, $n_k \neq m_k$ is satisfied, k=1, 2, ..., K, and $\phi_i$ is a phase compensation factor.

Optionally, the first PMI is corresponding to a first-level feedback matrix, and the first-level feedback matrix is a diagonal matrix.

Optionally, the first-level feedback matrix satisfies the following rule:

$$W_1 = \begin{bmatrix} X_n & 0 \\ 0 & X_m \end{bmatrix},$$

where $W_1$ is the first-level feedback matrix.

In a codebook design of two-dimensional antennas, it is assumed that a quantity of first-dimensional antenna ports is $N_1$, and a quantity of second-dimensional antenna ports is $N_2$. $X_n$ and $X_m$ are separately generated in a manner of a Kronecker product of a first-dimensional codebook and a second-dimensional codebook. That is, $X_n = X_1^k \otimes X_2^l$, and $X_m = X_1^{k'} \otimes X_2^{l'}$. $X_1^k$ and $X_1^{k'}$ are DFT matrixes whose dimension is $N_1 \times K$, and $X_2^l$ and $X_2^{l'}$ are DFT matrixes whose dimension is $N_2 \times L$.

An $i^{th}$ column vector of $X_1^k$ satisfies the following rule:

$$(X_1^k)_i = \begin{bmatrix} 1 & e^{j2\pi \frac{ki}{Q_1}} & \ldots & e^{j2\pi \frac{ki}{Q_1}(N_1-1)} \end{bmatrix} \quad \text{(Formula 5)}$$

An $i^{th}$ column vector of $X_1^{k'}$ satisfies the following rule:

$$(X_1^{k'})_i = \begin{bmatrix} 1 & e^{j2\pi \frac{k'i}{Q_1}} & \ldots & e^{j2\pi \frac{k'i}{Q_1}(N_1-1)} \end{bmatrix} \quad \text{(Formula 6)}$$

An $i^{th}$ column vector of $X_2^l$ satisfies the following rule:

$$(X_2^l)_i = \begin{bmatrix} 1 & e^{j2\pi \frac{li}{Q_2}} & \ldots & e^{j2\pi \frac{li}{Q_2}(N_2-1)} \end{bmatrix} \quad \text{(Formula 7)}$$

An $i^{th}$ column vector of $X_2^{l'}$ satisfies the following rule:

$$(X_2^{l'})_i = \begin{bmatrix} 1 & e^{j2\pi \frac{l'i}{Q_2}} & \ldots & e^{j2\pi \frac{l'i}{Q_2}(N_2-1)} \end{bmatrix} \quad \text{(Formula 8)}$$

In this embodiment of the present disclosure, there are two relationships between $X_m$ and $X_n$.

A first relationship is $X_n = X_m$.

For example, when k=4 and l=2, (Formula 9)

$$X_n = X_1^k \otimes X_2^l$$
$$= \begin{bmatrix} (X_1^k)_1 \otimes (X_2^l)_1 & (X_1^k)_2 \otimes (X_2^l)_1 & (X_1^k)_3 \otimes (X_2^l)_1 & (X_1^k)_4 \otimes (X_2^l)_1 \\ (X_1^k)_1 \otimes (X_2^l)_2 & (X_1^k)_2 \otimes (X_2^l)_2 & (X_1^k)_3 \otimes (X_2^l)_2 & (X_1^k)_4 \otimes (X_2^l)_2 \end{bmatrix}$$
$$= \begin{bmatrix} b_{k_1,l_1}, b_{k_2,l_1}, b_{k_3,l_1}, b_{k_4,l_1}, \\ b_{k_1,l_2}, b_{k_2,l_2}, b_{k_3,l_2}, b_{k_4,l_2}, \end{bmatrix}$$

There are two association relationships between associated vectors in $W_1$:

(3) Second dimensions are the same, and in this case, $X_n$ may be divided into four groups:
a first group is $X_n^{(1)} = \{b_{k_1,l_1}, b_{k_2,l_1}\}$;
a second group is $X_n^{(2)} = \{b_{k_3,l_1}, b_{k_4,l_1}\}$;
a third group is $X_n^{(3)} = \{b_{k_1,l_2}, b_{k_2,l_2}\}$; and
a fourth group is $X_n^{(4)} = \{b_{k_3,l_2}, b_{k_4,l_2}\}$.

That is, two vector sets in the first group are associated, two vector sets in the second group are associated, two vector sets in the third group are associated, and two vector sets in the fourth group are associated.

(4) First dimensions are the same, and in this case, $X_n$ may be divided into four groups:
a first group is $X_n^{(1)} = \{b_{k_1,l_1}, b_{k_1,l_2}\}$;
a second group is $X_n^{(2)} = \{b_{k_2,l_1}, b_{k_2,l_2}\}$;
a third group is $X_n^{(3)} = \{b_{k_3,l_1}, b_{k_3,l_2}\}$; and
a fourth group is $X_n^{(4)} = \{b_{k_4,l_1}, b_{k_4,l_2}\}$.

Likewise, two vector sets in the first group are associated, two vector sets in the second group are associated, two vector sets in the third group are associated, and two vector sets in the fourth group are associated.

When the rank indicating the quantity of transmission layers is 1, $W_2$ is used to select a group number, and select a phase difference between two vectors in a group. For example, if $W_2$ selects the second group, and the phase difference between two vectors is $\phi$, for the association relationship between the associated vectors when the second dimensions are the same, W satisfies the following rule:

$$W = W_1 W_2 = \begin{bmatrix} b_{k_3,l_1} \\ \phi b_{k_4,l_1} \end{bmatrix} \quad \text{(Formula 10)}$$

For the association relationship between the associated vectors when the first dimensions are the same, W satisfies the following rule:

$$W = W_1 W_2 = \begin{bmatrix} b_{k_2,l_1} \\ \phi b_{k_2,l_2} \end{bmatrix} \quad \text{(Formula 11)}$$

A second relationship is $X_n \neq X_m$.

In this case, $X_n$ and $X_m$ each have four column vectors.

(Formula 12)

When $k = 2$ and $l = 2$,
$$X_n = [(X_1^k)_1 \otimes (X_2^l)_1 \quad (X_1^k)_3 \otimes (X_2^l)_1 \quad (X_1^k)_1 \otimes (X_2^l)_2 \quad (X_1^k)_3 \otimes (X_2^l)_2]$$
$$= [b_{k_1,l_1}, b_{k_3,l_1}, b_{k_1,l_2}, b_{k_3,l_2}]$$

(Formula 13)
$$X_m = [(X_1^k)_2 \otimes (X_2^l)_1 \quad (X_1^k)_4 \otimes (X_2^l)_1 \quad (X_1^k)_2 \otimes (X_2^l)_2 \quad (X_1^k)_4 \otimes (X_2^l)_2]$$
$$= [b_{k_2,l_1}, b_{k_4,l_1}, b_{k_2,l_2}, b_{k_4,l_2}]$$

(Formula 14)

When $k = 4$ and $l = 1$,
$$X_n = [(X_1^k)_1 \otimes (X_2^l)_1 \quad (X_1^k)_2 \otimes (X_2^l)_1 \quad (X_1^k)_3 \otimes (X_2^l)_1 \quad (X_1^k)_4 \otimes (X_2^l)_1]$$
$$= [b_{k_1,l_1}, b_{k_2,l_1}, b_{k_3,l_1}, b_{k_4,l_1},]$$

(Formula 15)
$$X_m = [(X_1^k)_1 \otimes (X_2^l)_2 \quad (X_1^k)_2 \otimes (X_2^l)_2 \quad (X_1^k)_3 \otimes (X_2^l)_2 \quad (X_1^k)_4 \otimes (X_2^l)_2]$$
$$= [b_{k_1,l_2}, b_{k_2,l_2}, b_{k_3,l_2}, b_{k_4,l_2},]$$

When the rank indicating the quantity of transmission layers is 1, $W_2$ is used to select a group number, and select a phase difference between two vectors in a group. For example, if $W_2$ selects the second group, and the phase difference between two vectors is φ, for the association relationship between the associated vectors when the second dimensions are the same, W satisfies the following rule:

$$W = W_1 W_2 = \begin{bmatrix} b_{k_3, l_1} \\ \phi b_{k_4, l_1} \end{bmatrix}.$$

For the association relationship between the associated vectors when the first dimensions are the same, W satisfies the following rule:

$$W = W_1 W_2 = \begin{bmatrix} b_{k_2, l_1} \\ \phi b_{k_2, l_2} \end{bmatrix}.$$

In this embodiment of the present disclosure, optionally, the second PMI is corresponding to a second-level feedback matrix, and the second-level feedback matrix includes at least one first column vector in $X_n$ and at least one second column vector in $X_m$.

In this embodiment of the present disclosure, optionally, if $X_n$ is the same as $X_m$, a first column vector different from the at least one second column vector exists in the at least one first column vector.

If $X_n$ is different from $X_m$, a column number of a column vector selected by $W_2$ from a diagonal matrix $X_n$ of $W_1$ is the same as a column vector number of a column vector selected from $X_m$.

Figure 3A:
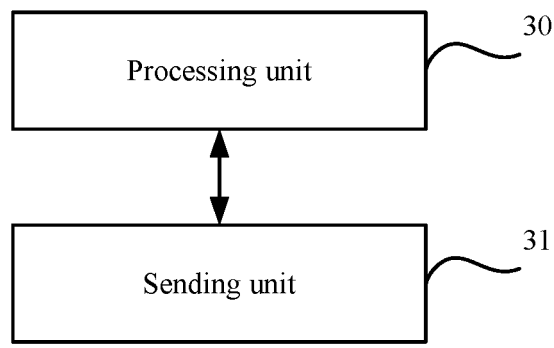
FIG. 3A is a schematic diagram of a precoding matrix determining apparatus according to an embodiment of the present disclosure.

Referring to FIG. 3A, an embodiment of the present disclosure further provides a precoding matrix determining apparatus, and the apparatus includes a processing unit 30 and a sending unit 31.

The processing unit 30 is configured to determine a precoding matrix, where the precoding matrix includes at least two column vector sets, a column vector associated with any column vector set of the at least two column vector sets exists in the at least two column vector sets, and both the any column vector set and the associated column vector are applied on different polarization antennas.

The processing unit 30 is further configured to determine a first precoding matrix indicator PMI and a second PMI based on the precoding matrix.

The sending unit 31 is configured to send the first PMI and the second PMI to a base station.

Optionally, when determining the precoding matrix, the processing unit 30 is specifically configured to:

determine a rank used to indicate a quantity of transmission layers and a codebook set corresponding to the rank; and select the precoding matrix from the codebook set.

Optionally, the precoding matrix satisfies the following rule:

$$W = \begin{bmatrix} v_{n_1} & v_{n_2} & \cdots & v_{n_k} \\ \varphi_1 v_{m_1} & \varphi_2 v_{m_2} & \cdots & \varphi_K v_{m_k} \end{bmatrix},$$

where $v_{n_k}$ and $v_{m_k}$ indicate an $n_k^{th}$ column vector and an $m_k^{th}$ column vector that are in a vector group set, $v_{n_k}$ is associated with $v_{m_k}$, $n_k \neq m_k$ is satisfied, k=1, 2, ..., K, and $\phi_i$ is a phase compensation factor.

Optionally, the first PMI is corresponding to a first-level feedback matrix, and the first-level feedback matrix is a diagonal matrix.

Optionally, the first-level feedback matrix satisfies the following rule:

$$W_1 = \begin{bmatrix} X_n & 0 \\ 0 & X_m \end{bmatrix},$$

where $W_1$ is the first-level feedback matrix.

Optionally, the second PMI is corresponding to a second-level feedback matrix, and the second-level feedback matrix includes at least one first column vector in $X_n$ and at least one second column vector in $X_m$.

Optionally, if $X_n$ is the same as $X_m$, a first column vector different from the at least one second column vector exists in the at least one first column vector.

If $X_n$ is different from $X_m$, a column number of a column vector selected by $W_2$ from a diagonal matrix $X_n$ of $W_1$ is the same as a column vector number of a column vector selected from $X_m$.

Figure 3B:
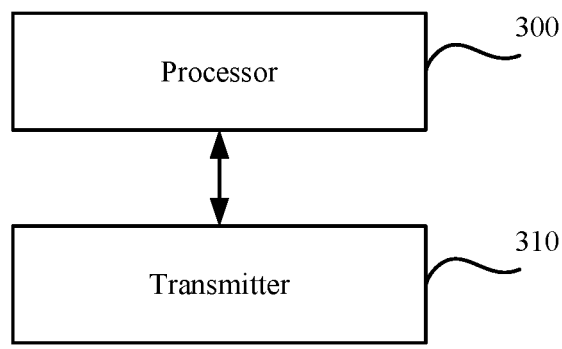
FIG. 3B is a schematic diagram of a precoding matrix determining apparatus according to an embodiment of the present disclosure.

Referring to FIG. 3B, an embodiment of the present disclosure further provides a precoding matrix determining apparatus, and the apparatus includes a processor 300 and a transmitter 310.

The processor 300 is configured to determine a precoding matrix, where the precoding matrix includes at least two column vector sets, a column vector associated with any column vector set of the at least two column vector sets exists in the at least two column vector sets, and both the any column vector set and the associated column vector are applied on different polarization antennas.

The processor 300 is further configured to determine a first precoding matrix indicator (PMI) and a second PMI based on the precoding matrix.

The transmitter 310 is configured to send the first PMI and the second PMI to a base station.

Optionally, when determining the precoding matrix, the processor 300 is specifically configured to:

determine a rank used to indicate a quantity of transmission layers and a codebook set corresponding to the rank; and select the precoding matrix from the codebook set.

Optionally, the precoding matrix satisfies the following rule:

$$W = \begin{bmatrix} v_{n_1} & v_{n_2} & \cdots & v_{n_k} \\ \varphi_1 v_{m_1} & \varphi_2 v_{m_2} & \cdots & \varphi_K v_{m_k} \end{bmatrix},$$

where $v_{n_k}$ and $v_{m_k}$ indicate an $n_k^{th}$ column vector and an $m_k^{th}$ column vector that are in a vector group set, $v_{n_k}$ is associated with $v_{m_k}$, $n_k \neq m_k$ is satisfied, k=1, 2, ..., K, and $\phi_i$ is a phase compensation factor.

Optionally, the first PMI is corresponding to a first-level feedback matrix, and the first-level feedback matrix is a diagonal matrix.

Optionally, the first-level feedback matrix satisfies the following rule:

$$W_1 = \begin{bmatrix} X_n & 0 \\ 0 & X_m \end{bmatrix},$$

where $W_1$ is the first-level feedback matrix.

Optionally, the second PMI is corresponding to a second-level feedback matrix, and the second-level feedback matrix includes at least one first column vector in $X_n$ and at least one second column vector in $X_m$.

Optionally, if $X_n$ is the same as $X_m$, a first column vector different from the at least one second column vector exists in the at least one first column vector.

If $X_n$ is different from $X_m$, a column number of a column vector selected by $W_2$ from a diagonal matrix $X_n$ of $W_1$ is the same as a column vector number of a column vector selected from $X_m$.

Figure 4A:
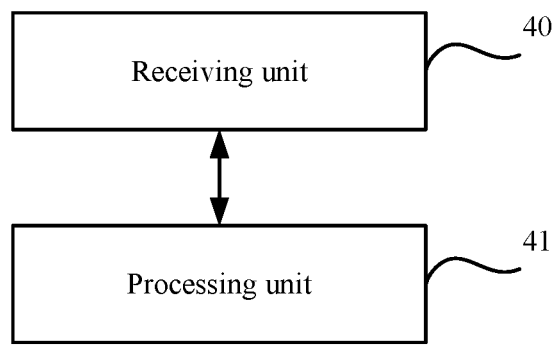
FIG. 4A is a schematic diagram of a precoding matrix determining apparatus according to an embodiment of the present disclosure.

Referring to FIG. 4A, an embodiment of the present disclosure further provides a precoding matrix determining apparatus, and the apparatus includes a receiving unit 40 and a processing unit 41.

The receiving unit 40 is configured to receive a first precoding matrix indicator (PMI) and a second PMI that are sent by a terminal.

The processing unit 41 is configured to determine a precoding matrix based on the first PMI and the second PMI, where the precoding matrix includes at least two column vector sets, a column vector associated with any column vector set of the at least two column vector sets exists in the at least two column vector sets, and both the any column vector set and the associated column vector are applied on different polarization antennas.

Optionally, when determining the precoding matrix based on the first PMI and the second PMI, the processing unit 41 is specifically configured to:

determine a rank used to indicate a quantity of transmission layers and a codebook set corresponding to the rank; and select the precoding matrix from the codebook set based on the first PMI and the second PMI.

Optionally, the precoding matrix satisfies the following rule:

$$W = \begin{bmatrix} v_{n_1} & v_{n_2} & \cdots & v_{n_k} \\ \varphi_1 v_{m_1} & \varphi_2 v_{m_2} & \cdots & \varphi_K v_{m_k} \end{bmatrix},$$

where $v_{n_k}$ and $v_{m_k}$ indicate an $n_k^{th}$ column vector and an $m_k^{th}$ column vector that are in a vector group set, $v_{n_k}$ is associated with $v_{m_k}$, $n_k \neq m_k$ is satisfied, k=1, 2, ..., K, and $\varphi_i$ is a phase compensation factor.

Optionally, the first PMI is corresponding to a first-level feedback matrix, and the first-level feedback matrix is a diagonal matrix.

Optionally, the first-level feedback matrix satisfies the following rule:

$$W_1 = \begin{bmatrix} X_n & 0 \\ 0 & X_m \end{bmatrix},$$

where $W_1$ is the first-level feedback matrix.

Optionally, the second PMI is corresponding to a second-level feedback matrix, and the second-level feedback matrix includes at least one first column vector in $X_n$ and at least one second column vector in $X_m$.

Optionally, if $X_n$ is the same as $X_m$, a first column vector different from the at least one second column vector exists in the at least one first column vector.

If $X_n$ is different from $X_m$, a column number of a column vector selected by $W_2$ from a diagonal matrix $X_n$ of $W_1$ is the same as a column vector number of a column vector selected from $X_m$.

Figure 4B:
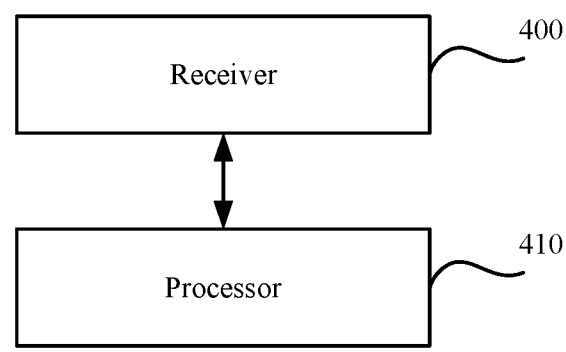
FIG. 4B is a schematic diagram of a precoding matrix determining apparatus according to an embodiment of the present disclosure.

Referring to FIG. 4B, an embodiment of the present disclosure further provides a precoding matrix determining apparatus, and the apparatus includes a receiver 400 and a processor 410.

The receiver 400 is configured to receive a first precoding matrix indicator (PMI) and a second PMI that are sent by a terminal.

The processor 410 is configured to determine a precoding matrix based on the first PMI and the second PMI, where the precoding matrix includes at least two column vector sets, a column vector associated with any column vector set of the at least two column vector sets exists in the at least two column vector sets, and both the any column vector set and the associated column vector are applied on different polarization antennas.

Optionally, when determining the precoding matrix based on the first PMI and the second PMI, the processor 410 is specifically configured to:

determine a rank used to indicate a quantity of transmission layers and a codebook set corresponding to the rank; and select the precoding matrix from the codebook set based on the first PMI and the second PMI.

Optionally, the precoding matrix satisfies the following rule:

$$W = \begin{bmatrix} v_{n_1} & v_{n_2} & \cdots & v_{n_k} \\ \varphi_1 v_{m_1} & \varphi_2 v_{m_2} & \cdots & \varphi_K v_{m_k} \end{bmatrix},$$

where $v_{n_k}$ and $v_{m_k}$ indicate an $n_k^{th}$ column vector and an $m_k^{th}$ column vector that are in a vector group set, $v_{n_k}$ is associated with $v_{m_k}$, $n_k \neq m_k$ is satisfied, k=1, 2, ..., K, and $\varphi_i$ is a phase compensation factor.

Optionally, the first PMI is corresponding to a first-level feedback matrix, and the first-level feedback matrix is a diagonal matrix.

Optionally, the first-level feedback matrix satisfies the following rule:

$$W_1 = \begin{bmatrix} X_n & 0 \\ 0 & X_m \end{bmatrix},$$

where $W_1$ is the first-level feedback matrix.

Optionally, the second PMI is corresponding to a second-level feedback matrix, and the second-level feedback matrix includes at least one first column vector in $X_n$ and at least one second column vector in $X_m$.

Optionally, if $X_n$ is the same as $X_m$, a first column vector different from the at least one second column vector exists in the at least one first column vector.

If $X_n$ is different from $X_m$, a column number of a column vector selected by $W_2$ from a diagonal matrix $X_n$ of $W_1$ is the same as a column vector number of a column vector selected from $X_m$.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A precoding matrix determining method, comprising:
   determining, by a terminal, a precoding matrix, wherein the precoding matrix comprises at least two column vector sets, a column vector associated with any column vector set of the at least two column vector sets exists in the at least two column vector sets, and both the any column vector set and the associated column vector are applied to different polarization antennas;
   determining, by the terminal, a first precoding matrix indicator (PMI) and a second PMI based on the precoding matrix; and
   sending, by the terminal, the first PMI and the second PMI to a base station,
   wherein the precoding matrix satisfies the following rule:

$$W = \begin{bmatrix} v_{n_1} & v_{n_2} & \cdots & v_{n_k} \\ \varphi_1 v_{m_1} & \varphi_2 v_{m_2} & \cdots & \varphi_K v_{m_k} \end{bmatrix},$$

wherein
   $v_{n_k}$ and $v_{m_k}$ indicate an $n_k^{th}$ column vector and an $m_k^{th}$ column vector that are in a vector group set, $v_{n_k}$ is associated with $v_{m_k}$, $n_k \neq m_k$ is satisfied, $k = 1, 2, \ldots, K$, and $\varphi_i$ is a phase compensation factor.

2. The method according to claim 1, wherein the determining, by a terminal, a precoding matrix comprises:
   determining, by the terminal, a rank used to indicate a quantity of transmission layers and a codebook set corresponding to the rank; and
   selecting, by the terminal, the precoding matrix from the codebook set.

3. The method according to claim 1, wherein the first PMI corresponds to a first-level feedback matrix, and the first-level feedback matrix is a diagonal matrix.

4. The method according to claim 3, wherein the first-level feedback matrix satisfies the following rule:

$$W_1 = \begin{bmatrix} X_n & 0 \\ 0 & X_m \end{bmatrix},$$

wherein
   $W_1$ is the first-level feedback matrix.

5. The method according to claim 4, wherein the second PMI corresponds to a second-level feedback matrix, and the second-level feedback matrix comprises at least one first column vector in $X_n$ and at least one second column vector in $X_m$.

6. The method according to claim 5, wherein when $X_n$ is the same as $X_m$, a first column vector different from the at least one second column vector exists in the at least one first column vector; or
   when $X_n$ is different from $X_m$, a column number of a column vector selected by $W_2$ from a diagonal matrix $X_n$ of $W_1$ is the same as a column vector number of a column vector selected from $X_m$.

7. A precoding matrix determining method, comprising:
   receiving, by a base station, a first precoding matrix indicator (PMI) and a second PMI that are sent by a terminal; and determining, by the base station, a precoding matrix based on the first PMI and the second PMI, wherein the precoding matrix comprises at least two column vector sets, a column vector associated with any column vector set of the at least two column vector sets exists in the at least two column vector sets, and both the any column vector set and the associated column vector are applied to different polarization antennas, wherein the precoding matrix satisfies the following rule:

$$W = \begin{bmatrix} v_{n_1} & v_{n_2} & \cdots & v_{n_k} \\ \varphi_1 v_{m_1} & \varphi_2 v_{m_2} & \cdots & \varphi_K v_{m_k} \end{bmatrix},$$

wherein $v_{n_k}$ and $v_{m_k}$ indicate an $n_k{}^{th}$ column vector and an $m_k{}^{th}$ column vector that are in a vector group set, $v_{n_k}$ is associated with $v_{m_k}$, $n_k \neq m_k$ is satisfied, $k = 1, 2, \ldots, K$, and $\phi_i$ is a phase compensation factor.

8. The method according to claim 7, wherein the determining, by the base station, a precoding matrix based on the first PMI and the second PMI comprises:

determining, by the base station, a rank used to indicate a quantity of transmission layers and a codebook set corresponding to the rank; and selecting, by the base station, the precoding matrix from the codebook set based on the first PMI and the second PMI.

9. The method according to claim 7, wherein the first PMI corresponds to a first-level feedback matrix, and the first-level feedback matrix is a diagonal matrix.

10. The method according to claim 9, wherein the first-level feedback matrix satisfies the following rule:

$$W_1 = \begin{bmatrix} X_n & 0 \\ 0 & X_m \end{bmatrix},$$

wherein $W_1$ is the first-level feedback matrix.

11. The method according to claim 10, wherein the second PMI corresponds to a second-level feedback matrix, and the second-level feedback matrix comprises at least one first column vector in $X_n$ and at least one second column vector in $X_m$.

12. The method according to claim 11, wherein when $X_n$ is the same as $X_m$, a first column vector different from the at least one second column vector exists in the at least one first column vector; or when $X_n$ is different from $X_m$, a column number of a column vector selected by $W_2$ from a diagonal matrix $X_n$ of $W_1$ is the same as a column vector number of a column vector selected from $X_m$.

13. A precoding matrix determining apparatus, comprising:

a processor, configured to determine a precoding matrix, wherein the precoding matrix comprises at least two column vector sets, a column vector associated with any column vector set of the at least two column vector sets exists in the at least two column vector sets, and both the any column vector set and the associated column vector are applied on different polarization antennas, wherein the processor is further configured to determine a first precoding matrix indicator (PMI) and a second PMI based on the precoding matrix; and a transmitter, configured to send the first PMI and the second PMI to a base station, wherein the precoding matrix satisfies the following rule:

$$W = \begin{bmatrix} v_{n_1} & v_{n_2} & \cdots & v_{n_k} \\ \varphi_1 v_{m_1} & \varphi_2 v_{m_2} & \cdots & \varphi_K v_{m_k} \end{bmatrix},$$

wherein $v_{n_k}$ and $v_{m_k}$ indicate an $n_k{}^{th}$ column vector and an $m_k{}^{th}$ column vector that are in a vector group set, $v_{n_k}$ is associated with $v_{m_k}$, $n_k \neq m_k$ is satisfied, $k = 1, 2, \ldots, K$, and $\phi_i$ is a phase compensation factor.

14. The apparatus according to claim 13, wherein when determining the precoding matrix, the processor is configured to:

determine a rank used to indicate a quantity of transmission layers and a codebook set corresponding to the rank; and select the precoding matrix from the codebook set.

15. The apparatus according to any one of claim 13, wherein the first PMI corresponds to a first-level feedback matrix, and the first-level feedback matrix is a diagonal matrix.

16. The apparatus according to claim 15, wherein the first-level feedback matrix satisfies the following rule:

$$W_1 = \begin{bmatrix} X_n & 0 \\ 0 & X_m \end{bmatrix},$$

wherein $W_1$ is the first-level feedback matrix.

17. The apparatus according to claim 16, wherein the second PMI corresponds to a second-level feedback matrix, and the second-level feedback matrix comprises at least one first column vector in $X_n$ and at least one second column vector in $X_m$.

18. The apparatus according to claim 17, wherein when $X_n$ is the same as $X_m$, a first column vector different from the at least one second column vector exists in the at least one first column vector; or when $X_n$ is different from $X_m$, a column number of a column vector selected by $W_2$ from a diagonal matrix $x_n$ of $W_1$ is the same as a column vector number of a column vector selected from $X_m$.

* * * * *